Figure 1:
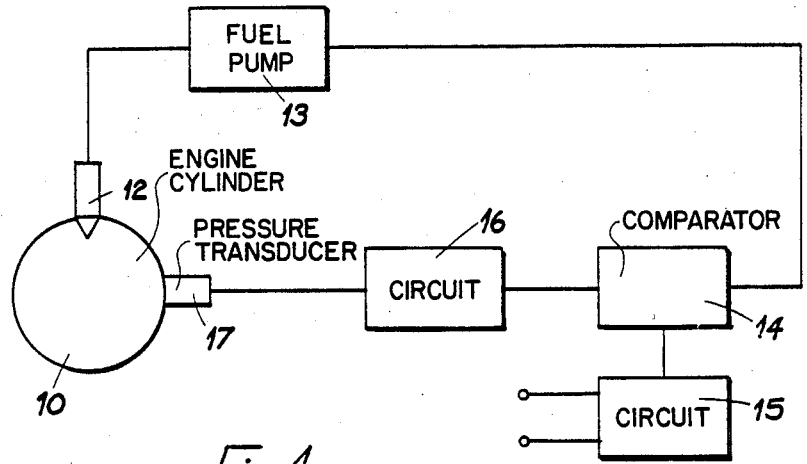

United States Patent [19]

Greeves et al.

[11] Patent Number: 4,583,507
[45] Date of Patent: Apr. 22, 1986

[54] ENGINE SYSTEM

[75] Inventors: Godfrey Greeves, Hatch End; Paul Lakra, London, both of England

[73] Assignee: Lucas Industries public limited company, Birmingham, England

[21] Appl. No.: 547,379

[22] Filed: Oct. 26, 1983

[30] Foreign Application Priority Data

Nov. 6, 1982 [GB] United Kingdom ............... 8231761

[51] Int. Cl.⁴ .................. F02P 5/12; F02M 59/20
[52] U.S. Cl. ................... 123/425; 123/501; 73/116
[58] Field of Search ............. 123/425, 435, 501, 502; 73/116, 115, 119 R, 119 A, 35

[56] References Cited

U.S. PATENT DOCUMENTS

| 4,356,551 | 10/1982 | Iwase et al. | 123/435 X |
| 4,381,748 | 5/1983 | Eckert et al. | 123/414 |
| 4,388,902 | 6/1983 | Latapie | 123/425 |
| 4,391,248 | 7/1983 | Latsch | 123/435 X |
| 4,449,501 | 5/1984 | Greeves | 123/435 X |

FOREIGN PATENT DOCUMENTS

| 135237 | 8/1982 | Japan | 123/501 |
| 1491622 | 11/1977 | United Kingdom | 123/425 |

Primary Examiner—Tony M. Argenbright

[57] ABSTRACT

An engine system of the reciprocating or rotating piston type has a device such as a pressure transducer for providing an indication of when combustion of fuel takes place in the engine. The signal provided by the device over a combustion cycle is stored in a memory and compared with a signal provided in a following cycle to provide a more positive indication of when in the cycle, combustion of fuel starts.

6 Claims, 2 Drawing Figures

ENGINE SYSTEM

This invention relates to an engine system including an engine of the reciprocating piston or rotary piston type, means for feeding fuel to the combustion chamber or chambers of the engine, means for varying the timing of ignition of fuel in the combustion chamber or chambers of the engine and means for sensing the combustion of fuel within the combustion chamber or chambers.

The correct timing of ignition of fuel within the combustion chamber or chambers of an engine of the type set forth is important in order to obtain satisfactory operation at the engine. Adjustment of the timing of ignition of the fuel is obtained in the case of a spark ignition engine, by adjustment of the instant at which the spark discharge at the sparking plug takes place. In the case of a compression ignition engine the adjustment is effected by altering the timing of delivery of fuel.

In order to obtain accurate control it is necessary to have a device which provides a signal of when ignition of the fuel takes place. Various devices have been proposed for this purpose. For example, it has been proposed to utilize light sensitive cells which observe the combustion of the fuel within the combustion chamber through a quartz or like window. It has also been proposed to utilize ionisation detectors which detect the flame front. Other forms of detector can be used for example pressure transducers which provide a signal indicative of a variation in the pressure within the combustion chamber due to combustion of fuel therein.

The signals provided by the devices are shaped in electrical circuits and compared with an engine position signal to determine whether or not adjustment of the timing is required. This determination may involve the use of additional engine data such as the speed of the engine and the load on the engine.

The signals provided by some of the devices whilst being relatively "sharp" i.e. exhibiting a substantial change when combustion of the fuel is detected, when the device is new, tend to deteriorate as the device is used. In some cases the deterioration takes place within a few minutes of engine operation. It therefore becomes more difficult to shape the signal with any degree of accuracy. Some of the devices for example the pressure transducer, do not in any case produce a "sharp" signal even when new.

The present invention is concerned with improving the signal which is derived from the device and which is used in the comparison determination as explained above. In most engines it is unlikely that the combustion characteristics in a combustion chamber will be exactly the same for each cycle of operation and the method employed is to store the signal from the device and to compare it with a signal obtained from the device in another cycle of operation, the difference between the two signals will be relatively sharp. In some instances however it may be desirable to artificially adjust the timing of the start of combustion by varying in the case of the cmpression ignition engine, the instant of fuel delivery to the engine or in the case of the spark ignition engine, the instant of spark discharge.

According to the invention in an engine system of the kind specified, said means for sensing the combustion of fuel comprises a device responsive to a condition within the combustion chamber, said condition occuring when combustion of fuel starts in the combustion chamber in use, said device providing an output signal, a memory circuit for storing said output signal and a comparison circuit for comparing the stored output signal obtained from said device with a signal produced in another cycle of operation of the combustion chamber, the output of said comparison circuit being utilized as the signal indicative of the commencement of combustion of fuel in the combustion chamber.

According to a further feature of the invention the system when the engine is a compression ignition engine, includes means for modulating the timing of delivery of fuel or when the engine is a spark ignition engine, means for modulating the ignition timing of the engine.

Figure 2:
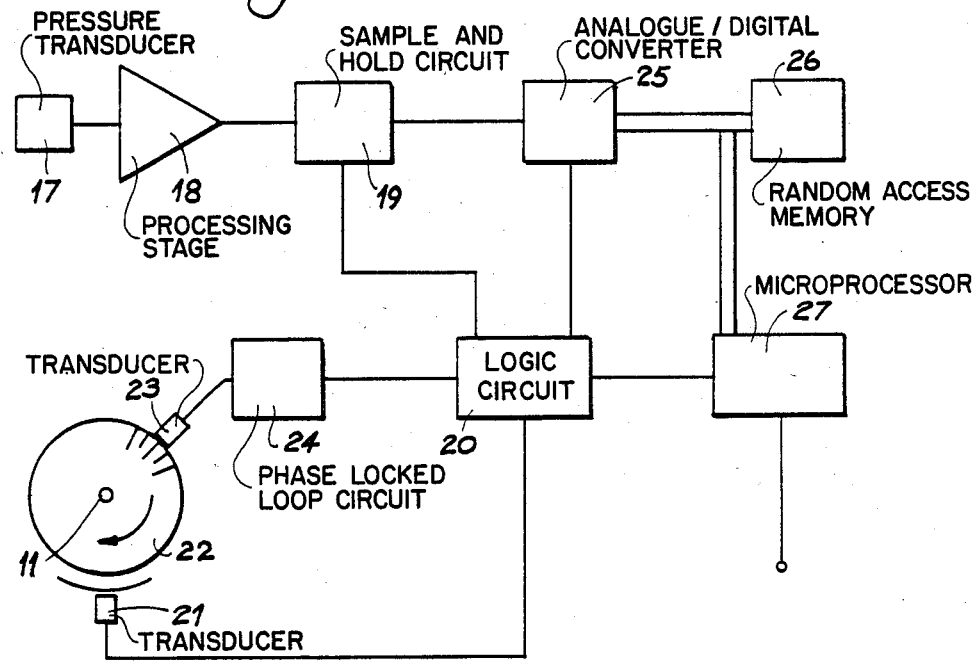

An example of an engine system in accordance with the invention will now be described with reference to the accompanying drawings, in which:

FIG. 1 is a block diagram of an engine system including a compression ignition engine; and FIG. 2 is a block diagram of part of the system seen in FIG. 1.

With reference to the drawings, there is shown at 10 an engine cylinder which contains a reciprocating piston coupled to a crankshaft the rotary axis of which is shown at 11 in FIG. 2. Mounted to direct fuel into the combustion chamber associated with the cylinder is a fuel injection nozzle 12 which is supplied with fuel in timed relationship with the engine by means of a fuel pump 13. The pump 13 includes electrical means for adjusting the timing of fuel delivery, the control signal for which is supplied by a comparator 14. The pump may for example be of the kind described in U.S. Pat. No. 4,292,012. The comparator in order to provide the control signal compares two signals one of which is the desired ignition timing signal and the other of which is the actual ignition timing signal. The desired ignition timing signal is supplied by a circuit 15 which is supplied with signals indicative of engine speed and engine load, the latter being represented by the amount of fuel being supplied to the engine. The circuit 15 contains stored information to enable it to provide the desired ignition timing signal for differing engine speeds and loads. The actual ignition timing signal is provided by a circuit 16 which will be described below, and which is supplied with a number of signals one of which is from a device 17 which provides a signal indicative of the onset of combustion. Conveniently the device 17 is a pressure transducer responsive to the pressure within the cylinder 10. In use, the timing of delivery of fuel by the fuel pump is adjusted so that the start of ignition of fuel takes place at the desired time.

The engine may be of the spark ignition type and in this case the ignition system would correspond to the pump 13.

Turning now to FIG. 2, the output signal of the transducer 17 which will be a varying analogue signal, is supplied by way of a processing stage 18 to a sample and hold circuit 19. The sample and hold circuit is controlled by a logic circuit 20 which receives a pulse input from a transducer 21 mounted adjacent a part 22 connected to the crankshaft of the engine so as to rotate therewith. The transducer 21 is responsive to marks on said part so that the logic circuit receives one pulse per revolution of the crankshaft. A further transducer 23 is mounted adjacent said part and is responsive to marks thereon so as to provide output pulses every 10° of rotation of the crankshaft. The pulses are supplied to a phase locked loop circuit 24 which is so arranged so as to provide output pulses to the logic circuit 20 corresponding to 0.5° of crankshaft rotation. The output of the sample and hold circuit is supplied to an analogue/-digital converter 25. Conveniently of 10 bit capacity, and the count value is stored in a Random Access Memory 26. The logic circuit is arranged so that the values of cylinder pressure are stored over the period from about 40° before top dead center to 80° after top center, this range being chosen so that it includes the start of ignition of the fuel and is broad enough to cope with expected timing variations. The block referenced 27 is a microprocessor from which the control signal is obtained. The memory 26 is also used to store a reference pressure waveform which may be a waveform obtained from the circuit 25 during an engine cycle in which ignition is arranged not to take place. In the case of a compression ignition engine this may be effected by preventing injection of fuel or in the case of a spark ignition engine by preventing spark discharge at the sparking plug.

The microprocessor is programmed to compare the actual waveform with the reference waveform and the difference between these two waveforms will show a substantial increase at the instant ignition of fuel takes place.

The reference pressure waveform may be a waveform obtained from the circuit 25 during a cycle of operation of the engine in which the timing of fuel delivery or the timing of the spark is deliberately retarded for example, by one or two degrees.

Alternatively the comparison may be arranged to take place between signals obtained during successive working cycles. This is possible because even when running at constant speed and load there wil be a variation between successive cycles of the start of ignition of the fuel.

We claim:

1. An engine system including an engine having a piston, means for feeding fuel to a combustion chamber of the engine, means for varying the timing of ignition of fuel in the combustion chamber and means for sensing the combustion of fuel comprising a device responsive to a condition within the combustion chamber, said condition occurring when combustion of fuel starts in the combustion chamber in use, said device providing an output signal, a memory circuit for storing said output signal and a comparison circuit for comparing the stored output signal over a period of the combustion chamber cylce during which combustion of fuel will occur, obtained from said device with a similar signal produced in another cycle of operation of the combustion chamber, the output of said comparison circuit being utilized as the signal indicative of the commencement of combustion fuel in the combustion chamber.

2. A system according to claim 1 in which said device comprises a pressure transducer.

3. An engine system including an engine having a piston, means for feeding fuel to a combustion chamber of the engine, means for varying the timing of ignition of fuel in the combustion chamber and means for sensing the combustion of fuel comprising a device responsive to a condition within the combustion chamber, said condition occurring when combustion of fuel starts in the combustion chamber in use, said device providing an output signal, a memory circuit for storing said output signal and a comparison circuit for comparing the stored output signal over a period of the combustion chamber cycle during which combustion of fuel will occur, obtained from said device with a similar signal produced in another cycle of operation of the combustion chamber, the output of said comparison circuit being utilized as the signal indicative of the commencement of combustion of fuel in the combustion chamber, said system further including a sample and hold circuit which receives the signal from said device, means for effecting operation of said sample and hold circuit at predetermined intervals during said period, an analog/-digital converter which converts the signal from said sample and hold circuit into digital form, a random access memory in which the converted signal values produced during said period are stored, in sequence and a microprocessor for comparing the sequence of signal values with a sequence of reference signal values.

4. A system according to claim 3 in which said sequence of reference signal values are a sequence of signal values obtained during a cycle of operation when combustion of fuel is prevented.

5. A system according to claim 3 in which said sequence of reference signal values are a sequence of signal values obtained during a cycle of operation during which the timing of combustion of fuel is deliberately altered.

6. A system according to claim 3 in which said reference signal values are instantaneous signal values obtained during a previous cycle of operation of the engine.

* * * * *